April 9, 1929.                J. H. NEWPORT                1,708,485
                               WATER HEATER
                           Filed May 21, 1925          2 Sheets-Sheet 1
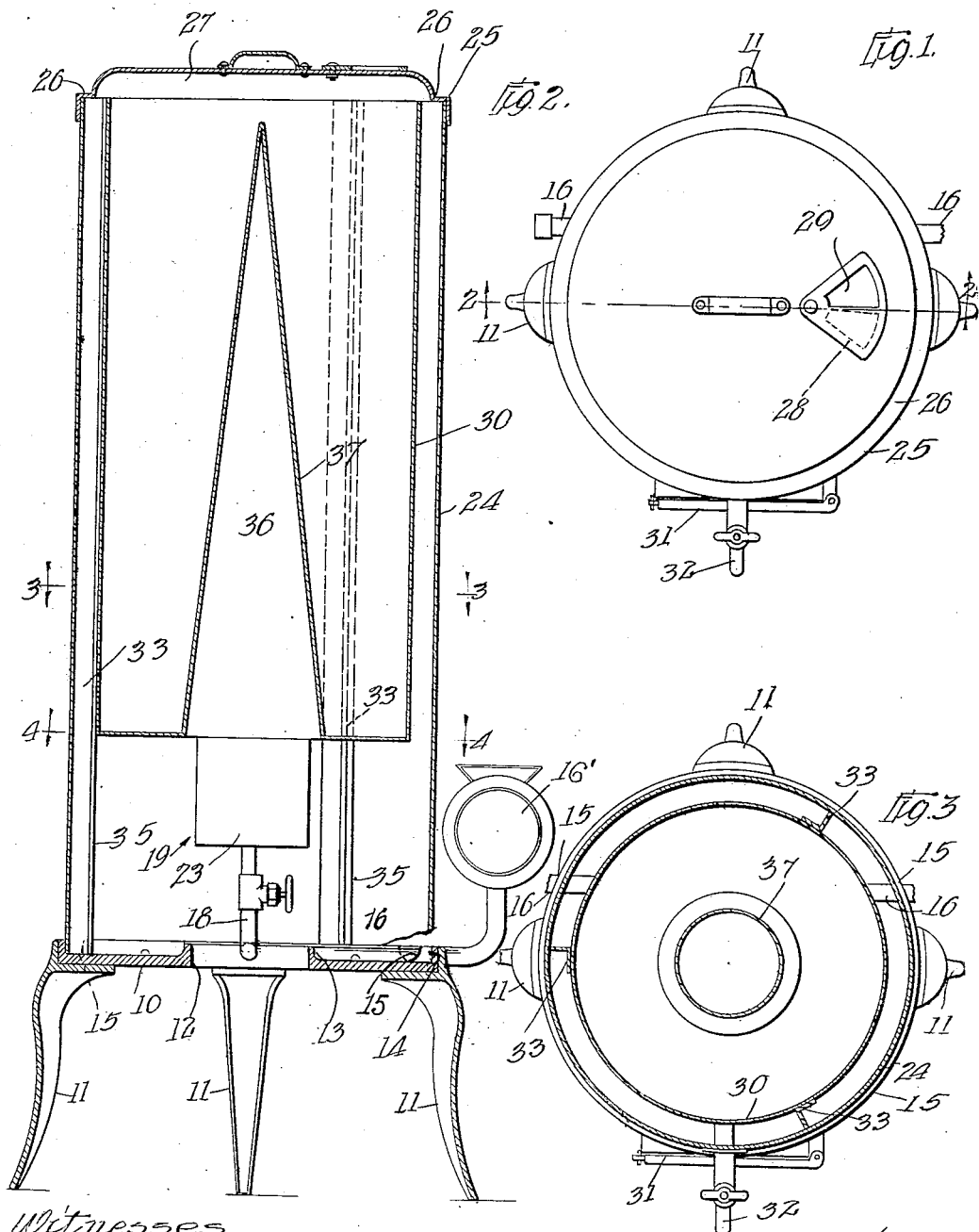
Witnesses
Harry M. White
William P. Kilroy
Inventor:
Jesse Herbert Newport
By George I. Haight Atty

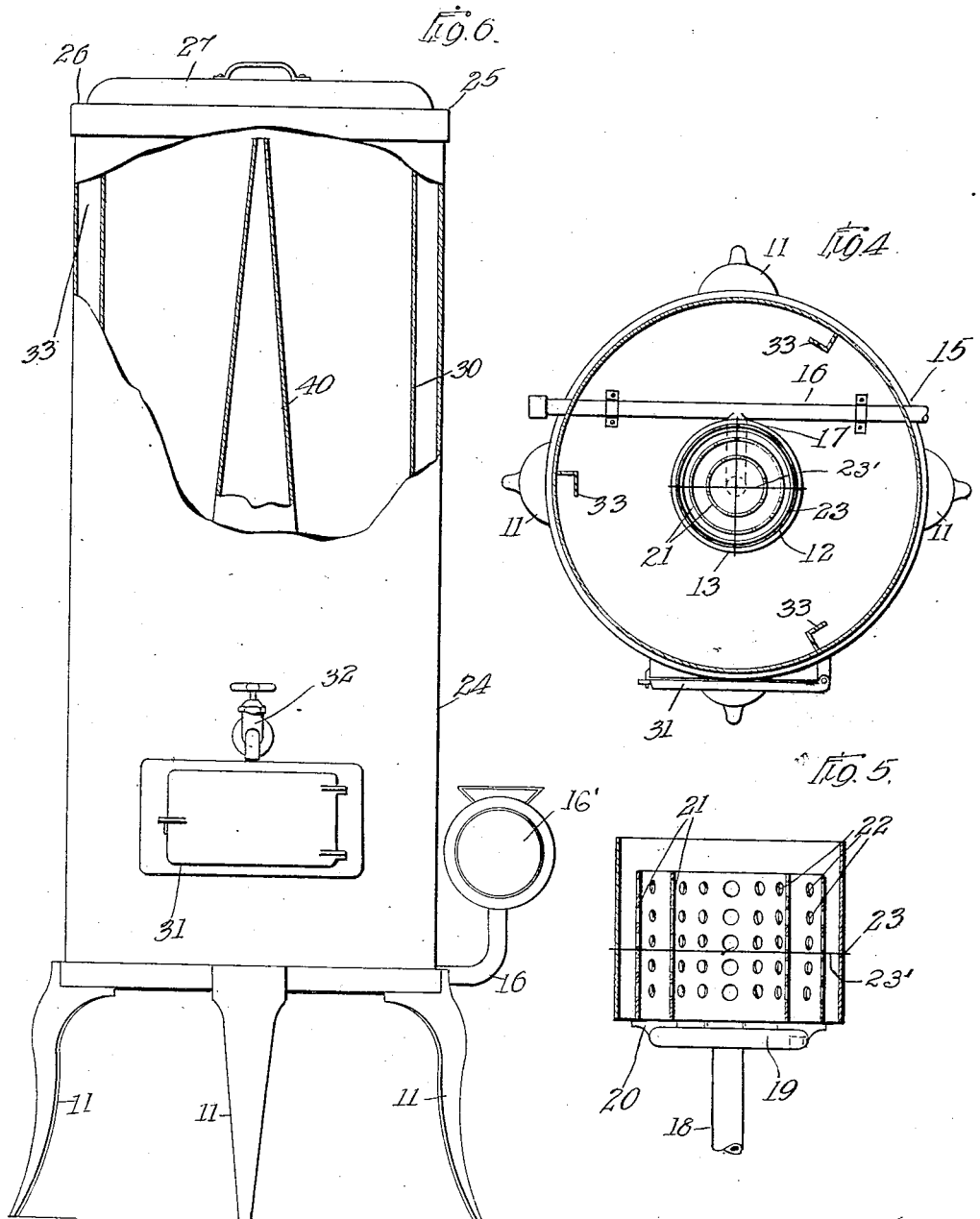

Patented Apr. 9, 1929.

1,708,485

UNITED STATES PATENT OFFICE.

JESSE HERBERT NEWPORT, OF CHICAGO, ILLINOIS.

WATER HEATER.

Application filed May 21, 1925. Serial No. 31,776.

This invention relates to water heaters.

In farming and outlying localities where water under pressure can not be had, difficulty has been experienced in obtaining a suitable supply of hot water when needed. Various types of gas and electric heaters have been evolved for heating water, which depend upon pressure in one form or another to force the water through the apparatus, or to maintain circulation therein, but heaters of this character are useless in situations where water under pressure, and gas or electricity, are not available.

My invention contemplates a portable kerosene burning heater, including an open tank or receptacle which may be filled by pouring the water thereinto, and which includes an outer casing surrounding said receptacle, said casing being adapted to be entirely closed to retain the heated air therewithin over long periods of time, and said tank or receptacle being arranged to be removably disposed within said casing.

Another object of the invention is to provide a tank or receptacle of a novel character, in which means are provided for heating the contents of said receptacle uniformly throughout, thereby diminishing the tendency of the hotter water to collect in the top of the tank.

Another object of the invention is to provide a heater which is especially cheap in constuction, requires few parts, is economical to manufacture, and requires a minimum of care.

Other and further objects of the invention will more fully and clearly appear from the description and claims hereinafter following.

In the drawings Figure 1 is a top plan view of the invention; Figure 2 is a diametrical sectional view of the invention on the line 2—2 of Figure 1, showing parts of the apparatus in elevation; Figure 3 is a horizontal sectional view of the invention on the line 3—3 of Figure 2; Figure 4 is a horizontal sectional view of the invention on the line 4—4 of Figure 2; Figure 5 is an enlarged detailed view of a burner construction used in connection with the invention; and Figure 6 is a front elevational, partial sectional, view of the invention, showing a slightly modified form of the heat equalizing means.

As shown in the drawings, 10 denotes a base plate to which is fastened suitable supporting legs 11. The base plate is provided with a centrally disposed aperture 12, which is surrounded by an upstanding boss or rib 13. The extremity of the base 10 is provided with an upwardly extending circumferential rib or flange 14, and such flange is provided with oppositely disposed notches 15, which are offset relative to the center of the base plate, said notches being provided for the reception of a supply pipe 16 leading to the tank 16', which may contain kerosene or the like. Communicating with the supply pipe 16 is an extension 17, having an upturned end portion 18, upon which is mounted the burner 19, which may be of any ordinary construction, the extension on the pipe 16 serving to dispose the burner co-axially with the base plate 10. The burner is provided with a shelf 20 which supports a plurality of concentrically disposed cylindrical portions 21, provided with apertures 22, and an outer cylindrical member 23 disposed about the members 21, the various cylindrical members being secured together by wires 23' extending through the parts.

The heater is provided with an outer cylindrical casing 24 of any suitable sheet metal construction, said casing being open at its opposite ends, and of such a diameter that the bottom edges of the casing fit snugly and detachably within the circumferentially disposed flange 14, as clearly shown in Figure 2. The upper edges of the casing 24 are adapted to have detachably mounted thereon, a lid or cover portion 25, such cover being provided with an offset 26 adapted to rest upon the top edges of the casing 24, and with a compartment 27 formed in the top of the cover 25, so that the same extends upwardly beyond the top edges of the casing 24. The cover is provided with a preferably segmental opening 28 in its top, and pivotally secured to such cover is a shutter 29 adapted to adjust the size of the opening 28, or completely close the same as desired. The base plate 10, the casing 24, and the cover 25, provide an enclosure which entirely surrounds the burner, and a tank or heating receptacle 30 disposed therewithin. A suitable door 31 may be formed in the lower portion of the casing 24 to permit ready access to the burner 18. A spigot 32 is tapped into the lower portion of the casing 24, and is adapted to be connected with the tank 30, by any suitable means if desired.

The tank 30, in which the water to be heated is placed, is made up of any suitable sheet metal and comprises a cylindrical portion of somewhat less diameter than the outer casing 24, so that the walls of the tank may be spaced a suitable distance from the interior walls of the casing to permit the passage of the heated air therebetween. Means are provided for maintaining the spaced relation between the walls of the tank and casing, and such means are preferably in the form of angle members 33, preferably three in number and spaced circumferentially about the wall of the tank, each of said angle members 33 having one of its flanges securely fastened to the wall of the tank, and the other flange projecting outwardly therefrom in position to abut against the wall of the outer casing. The angle members 33 extend longitudinally throughout the extent of the tank, and project a suitable distance beyond the bottom of the tank to provide supports or legs 35 which rest upon the base plate 10, thereby supporting the bottom of the tank in spaced relation with reference to the base plate, so as to provide room for the burner 19, it being noted that when the cover 25 of the casing 24 is removed, the tank 30 may be inserted or withdrawn from the casing. If desired, the arrangement for spacing the tank and casing and supporting the tank, might be reversed, that is, the angle irons might be secured to the casing instead of to the tank, and provided with suitable ledges or projections for supporting the tank, the angle irons retaining their function of spacing the tank from the casing.

In order to heat the water rapidly and uniformly throughout means are provided for affording direct radiating surfaces in contact with the central portions of the body of water to be heated, said means including a hollow conical shell 37 which projects upwardly into the tank 30, and is open at the bottom to provide a chamber 36 which is disposed vertically over the burner, and due to its form the shell 37 diminishes in cross sectional area from the bottom upwardly, so that the greatest direct radiating surfaces are at the bottom of the tank and diminish toward the top thereof, resulting also in the provision of a tank having a reduced capacity at the bottom which increases toward the top of the same. The most intense heat from the burner therefore is applied initially to large direct radiating surfaces in contact with the colder portion of the body of water in the tank, such surfaces diminishing in area as they approach the warmer portions of the body of water and due to their distance from the source of heat being heated to a less degree, the heating components thereafter eddying or otherwise circulating so as to pass out of the chamber 36 and about the bottom and side walls of the tank, resulting in uniform and rapid heating of the body of water from top to bottom with the most effective expenditure of the heat units available.

A slightly modified form of the heating means is shown in Figure 6 of the drawing. In this construction the cone or shell 40 is open at the top to aid in effecting circulation.

By the above described arrangement it will be noted that the casing 24 may be removed from its position upon the base plate 10, leaving the tank supported thereon, or the tank or receptacle may be removed from the casing while the same retains its position upon the plate 10, it being pointed out that the angle members associated with the tank provide spacing means between the tank and outer casing, and in addition provide means for supporting the tank in operative relation with the burner.

The offset position of the notches 15 for the reception of the pipe 16 assures proper positioning of the burner 19 in co-axial relation with the chamber 36. As before mentioned the overall dimensions of the burner 19 are less than the lower opening of the chamber 36, which is for the purpose of permitting liquid of condensation which forms on the walls of the chamber 36 in certain phases of operation of the heater to pass clear of the burner 19, such liquid being retained by the base plate 10 due to the arrangement of the flange 12 and rib 14, the base plate acting as a drip pan. The liquid of condensation from the outer walls of the tank 30 also drains into the base plate, the moisture of condensation subsequently escaping from the heater as vapor.

It will also be appreciated that after the burner has been in operation a sufficiently long period to heat the contents of the tank to a certain desired temperature, the burner 19 may be cut off, and the shutter associated with the top or cover 25 of the casing 24 closed, thereby trapping the heated air in the casing, which heated air surrounds the receptacle and will maintain the contents thereof at the desired temperature for long periods of time. It is also pointed out that in a heater of this character the burner is entirely enclosed within the combustion chamber where it is at all times within the heated area, thereby insuring efficient combustion.

While I have herein shown and described what I now consider the preferred manner of carrying out my invention, the same is merely illustrative and I contemplate all changes and modifications that come within the scope of the claims appended hereto.

I claim:

1. In a heater, the combination with a casing having a fuel burning means associated therewith; of a liquid receptacle removably disposed in said casing, said receptacle having a plurality of angle irons associated therewith, one flange of each of which is secured to the side wall of said receptacle, and the other flange of which engages the inner wall of said casing to provide spacing means, said angle irons being extended to provide legs for supporting said receptacle in juxtaposition with reference to said fuel burning means.

2. In a heater, the combination with a supporting base provided with an upstanding rib at its extremities, and a centrally disposed opening surrounded by an upstanding boss; of a water receptacle adapted to be charged at the top thereof; a casing adapted to be supported on said base and arranged to fit within the rib formed thereon, said casing being provided with a removable cover portion; spacing members arranged along the sides of the receptacle to space the same from said casing, said spacing elements providing means for supporting said receptacle, said receptacle being provided with a central heating chamber extending from the bottom upwardly; fuel burning means supported by said base and disposed in line with said heating chamber; and means associated with said heater for regulating the same, said means including openings in the top and bottom of said base and said casing, and means associated with said top opening adapted to open and close the same.

3. In a hot water heater of the character described, the combination with a supporting base; of a water receptacle adapted to be charged at the top thereof; means for supporting said receptacle with the bottom thereof spaced above said supporting base; an outer casing surrounding and enclosing said receptacle, said casing extending down to and being supported on said supporting base, the walls of said casing and receptacle being spaced so as to provide flue passages for the products of combustion upwardly along the outer side of the receptacle; fuel burning means within said casing within the space between said supporting base and the bottom of said receptacle; and means providing a direct radiating surface to the central portions of the body of water to be heated, said means including a shell projecting within the receptacle, said shell being open at the bottom, disposed vertically over the burner and having its cross-sectional area diminishing from the bottom upwardly, whereby the direct radiating surface is greatest at the bottom of the receptacle and diminishes upwardly toward the top of the receptacle, to thereby induce a more uniform and rapid heating of the body of water from top to bottom.

4. In a heater, the combination with a supporting base; of a tubular casing having one end supported on said base and having a detachable cover for its opposite end, said cover being provided with a shutter; a receptacle having a closed bottom and open top, said receptacle being provided with means extending along its sides from top to bottom and projecting beyond its bottom to provide legs, said receptacle and legs being telescopically disposable within said casing, and said means spacing the walls of the receptacle and casing to define flue passages, and the legs of said means being adapted to rest upon said base to support said receptacle; a source of heat supply arranged between the bottom of said receptacle and said base.

5. In a heater, the combination with a supporting base; of a tubular casing having one end supported on said base, and having a detachable cover for its opposite end, said cover being provided with a shutter; a receptacle having an open top and a closed bottom, said bottom including a shell projecting upwardly from said bottom, said shell being open at the bottom, and centrally disposed with reference to said receptacle and having its cross sectional area diminishing from the bottom upwardly; means extending along the sides of said receptacle and projecting beyond its bottom to provide legs, said receptacle being telescopically disposable within said casing, and said means serving to space the walls of the receptacle and casing when the latter is in position to define flue passages, and the legs of said means being adapted to rest upon said base to support said receptacle; and a source of heat supply arranged between the bottom of said receptacle and said base and in line with said shell.

In witness that I claim the foregoing I have hereunto subscribed my name this 28th day of April, 1925.

JESSE HERBERT NEWPORT.